(12) United States Patent
Isler et al.

(10) Patent No.: US 10,134,285 B1
(45) Date of Patent: Nov. 20, 2018

(54) FLEETCAM INTEGRATION

(71) Applicant: Forward Thinking Systems, LLC, Jericho, NY (US)

(72) Inventors: David Isler, Plainview, NY (US); Stuart Lowenstein, West Hempstead, NY (US)

(73) Assignee: Forward Thinking Systems, LLC, Jericho, NY (US)

( * ) Notice: Subject to any disclaimer, the term of this patent is extended or adjusted under 35 U.S.C. 154(b) by 0 days.

(21) Appl. No.: 15/859,196

(22) Filed: Dec. 29, 2017

(51) Int. Cl.
| | |
|---|---|
| *G08G 1/00* | (2006.01) |
| *H04N 5/247* | (2006.01) |
| *G06T 11/60* | (2006.01) |
| *B60R 11/04* | (2006.01) |

(52) U.S. Cl.
CPC ............... *G08G 1/20* (2013.01); *G06T 11/60* (2013.01); *H04N 5/247* (2013.01); *B60R 11/04* (2013.01)

(58) Field of Classification Search
None
See application file for complete search history.

(56) References Cited

U.S. PATENT DOCUMENTS

| | | |
|---|---|---|
| 2006/0095175 A1 | 5/2006 | deWaal et al. |
| 2016/0332574 A1* | 11/2016 | Park ........................ H04N 7/181 |
| 2017/0017927 A1 | 1/2017 | Domnick et al. |
| 2017/0200061 A1* | 7/2017 | Julian .................. G06K 9/6202 |
| 2017/0263120 A1 | 9/2017 | Durie, Jr. et al. |
| 2017/0286782 A1* | 10/2017 | Pillai .................. G06K 9/00805 |
| 2017/0289089 A1* | 10/2017 | Liang ...................... H04L 51/32 |

OTHER PUBLICATIONS

"Electronic Driver Log Solutions to Better Manage Your Fleet," Web Archive—Internet Archive [online], Apr. 7, 2016 [retrieved on Mar. 1, 2018], Retrieved from the Internet: <URL:https://web.archive.org/web/20160407152016/http://www.ftsgps.com:80/electronic-driver-logs.html>, 7 pages.

* cited by examiner

*Primary Examiner* — Paul Berardesca
(74) *Attorney, Agent, or Firm* — Carr & Ferrell LLP

(57) ABSTRACT

A system and method for integrating a vehicular camera system is disclosed. A threshold value for metadata of one or more sensor devices and the vehicular camera system positioned in a first carrier vehicle is determined. Captured metadata is processed to determine whether the threshold value is exceeded, and a plurality of images is captured by one or more cameras of the vehicular camera system for a predetermined period, in response to exceeding the threshold value for metadata of the one or more sensor devices. The plurality of metadata is linked with each image from the plurality of captured images by matching the collection time of the metadata with the collection time for each image from the plurality of captured images, and a first image selected from the plurality of captured images is communicated along with the metadata linked to the first image, to at least one electronic device.

15 Claims, 9 Drawing Sheets

FLEETCAM INTEGRATION

CROSS-REFERENCE TO RELATED APPLICATIONS

This patent application is related to co-pending U.S. patent application Ser. No. 15/859,205, filed on Dec. 29, 2017 and entitled "Electronic Logs with Compliance Support and Prediction". The disclosure of the above-referenced application is herein incorporated by reference in its entirety for all purposes.

FIELD

The present application relates generally to adaptation of cameras in vehicles and, more specifically, to integration of camera systems in carrier fleets.

BACKGROUND

Records of Duty Status (ROD), often maintained in an electronic logbook referred to herein as Electronic Logging Devices (ELD's), are widely used to monitor compliance of State and Federal regulations by operators of carrier vehicles. Exemplary regulations include maximum driving time for a vehicle, and limitations to the number of operator on-duty hours. Circumstances such as weather and traffic events, construction events, and physical conditions of vehicle operators such as drowsiness or being distracted impair driving safety and efficiency that may lead to delays and increase the likelihood of incurring compliance violations. Unavoidable delays, resulting from weather conditions, for example, may be cause for exonerating penalties, provided that sufficient evidence is proffered. Visual evidence in the form of image files and video require large memories and communication bandwidth to record events on a continual basis. A system and method that gathers visual and sensor evidence for the purpose of avoiding compliance violations offering reduced memory and communications overhead can improve driver, and carrier fleet operations.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

A method for integrating a vehicular camera system is disclosed. The method includes determining a threshold value for metadata of one or more sensor devices, and capturing a plurality of metadata for a predetermined period by one or more sensor devices positioned in a first carrier vehicle. The method further includes processing the captured metadata to determine whether the threshold value is exceeded, and capturing a plurality of images by one or more cameras positioned in the first carrier vehicle for a predetermined period, in response to exceeding the threshold value for metadata of one or more sensor device. Also included in the method is linking the plurality of metadata with each image from the plurality of captured images by matching the collection time of the metadata with the collection time for each image from the plurality of captured images, and communicating a first image, selected from the plurality of captured images, and the metadata linked to the first image to at least one electronic device.

BRIEF DESCRIPTION OF THE DRAWINGS

Embodiments are illustrated by way of example and not limitation in the figures of the accompanying drawings, in which like references indicate similar elements.

DETAILED DESCRIPTION

The technology disclosed herein is directed to systems and methods for integration of cameras in carrier fleets.

The present technology may be used to provide camera systems used in conjunction with stand-alone electronic devices, or the technology may be provided in a networked configuration, including in a computing cloud network architecture.

Figure 1:
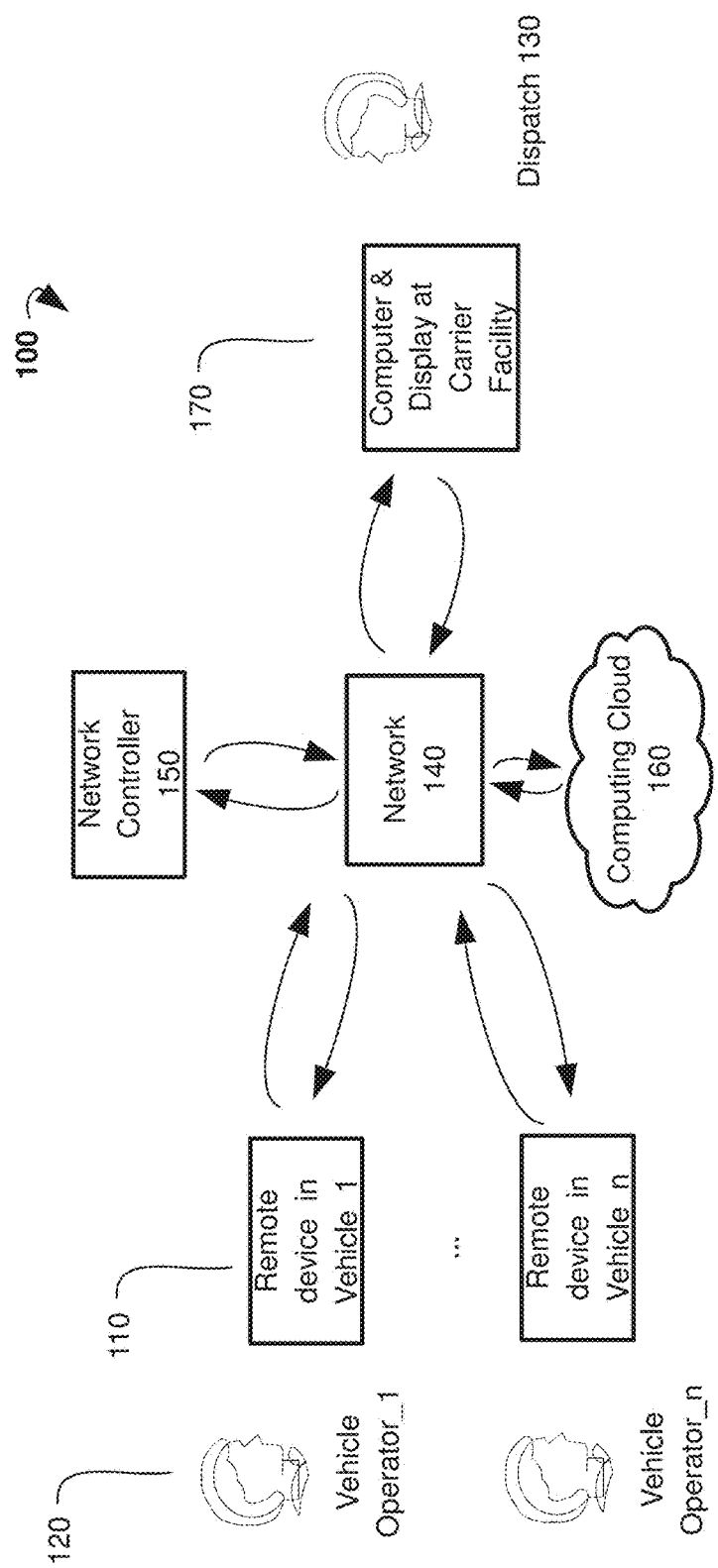
FIG. 1 is a block diagram illustrating a fleet management system without camera system support.

FIG. 1 is an illustration of an exemplary configuration of a networked electronic vehicle tracking and management system 100. In various embodiments, each vehicle in a fleet of vehicles (1 through 'n') is outfitted with a computer 110, also referred to a remote device in vehicle in FIG. 1. The computers 110 are each connected to a communications network 140, such as the internet, where a number of network controllers 150 route data between the vehicle computer 110 and a computer at a dispatch center at the carrier facility 170, for example. Dispatch 130 may communicate with vehicle operators 120 during transit in order to relay commands based on vehicle and operator information received by Dispatch at the carrier facility. The networked configuration may also use servers configured on a computing cloud 160 to perform data storage, retrieval, and other functions in response to commands sent by Dispatch 130 to the computing cloud 160. In some embodiments, vehicle and operator 120 performances may be monitored by Dispatch 130 for compliance with regulations that govern carrier transit. Federal and State agencies may enact and enforce regulations, for example. In some embodiments, regulations may be enacted by the carrier industry, or company-specific regulations may be imposed. Operator regulations include, for example, a limitation on a contiguous driving period, and a limitation on a contiguous on-duty period. Nonconformance with regulations may prompt a costly violation citation.

Figure 2:
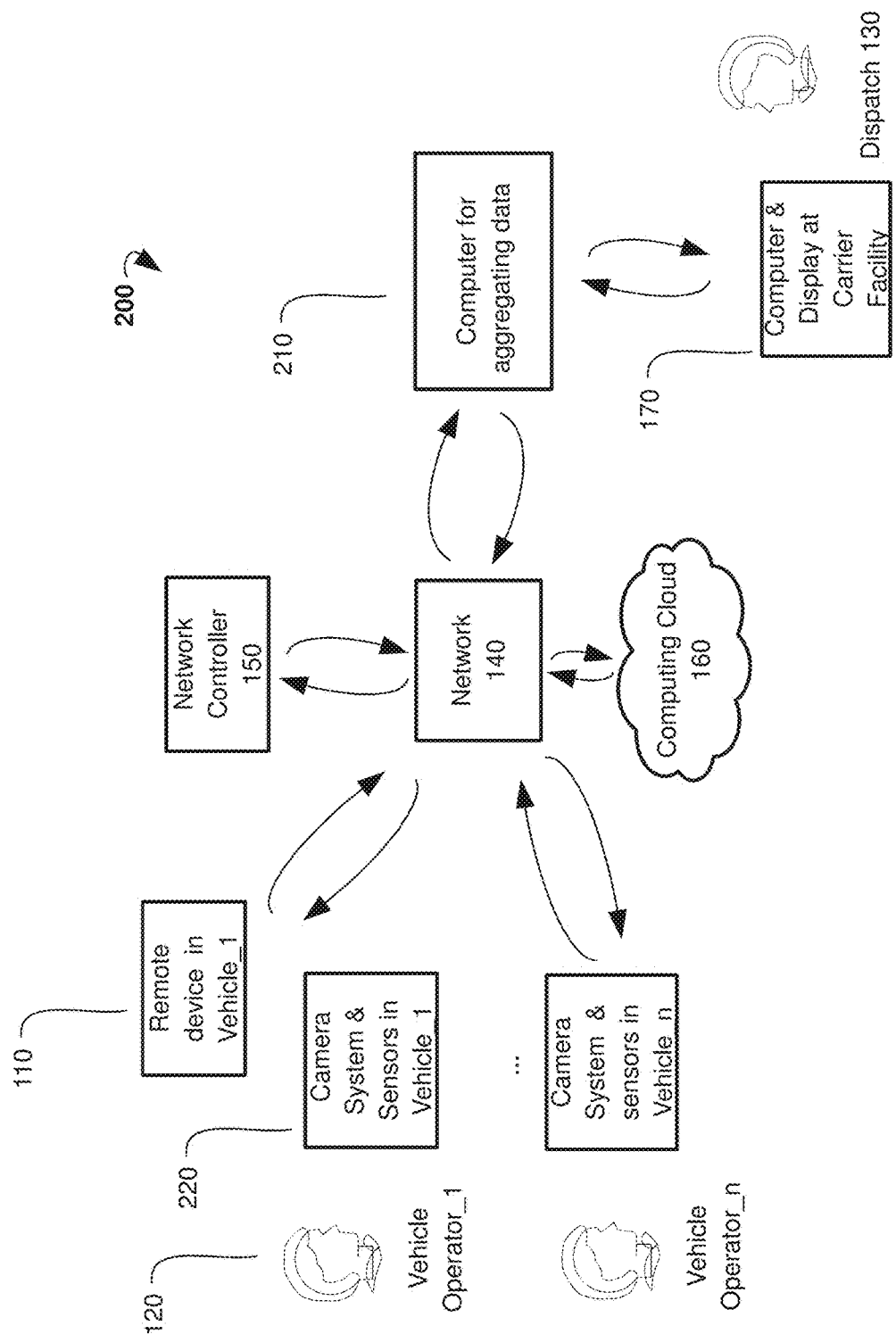
FIG. 2 is a block diagram illustrating a fleet management system with camera system support.

FIG. 2 is an illustration of an exemplary configuration of a networked electronic vehicle tracking and management system 200, similar to the configuration shown in FIG. 1, with the addition of a computer 210 for aggregating vehicle service data and optionally, having a capability to predict impending noncompliance with regulations. Also included is a remote device connected with a camera system and sensors 220 having a capability to image multiple views interior and exterior to the vehicle, and perform measurements and record data related to vehicle service. Vehicle service data may include, for example, weather, traffic, and road construction conditions that could impact the expected time of arrival (ETA) at various stops during transit. Other vehicle service data may include driver specific information, such as rest stop requirements, or vehicle specific data such as incidence of breakdown. Sensor derived vehicle service data includes vehicle g-force measurements, engine speed, and rpm, which are useful for ascertaining accident involvement, and driver performance such as abrupt acceleration, cornering, and braking.

Under prompting from Dispatch 130, or autonomously, the computer 210 may determine the risk of regulation noncompliance. In some embodiments, the computer 210 specifies a remedial action to help prevent or mitigate an anticipated noncompliance event, thereby avoiding or minimizing a violation penalty.

Figure 3:
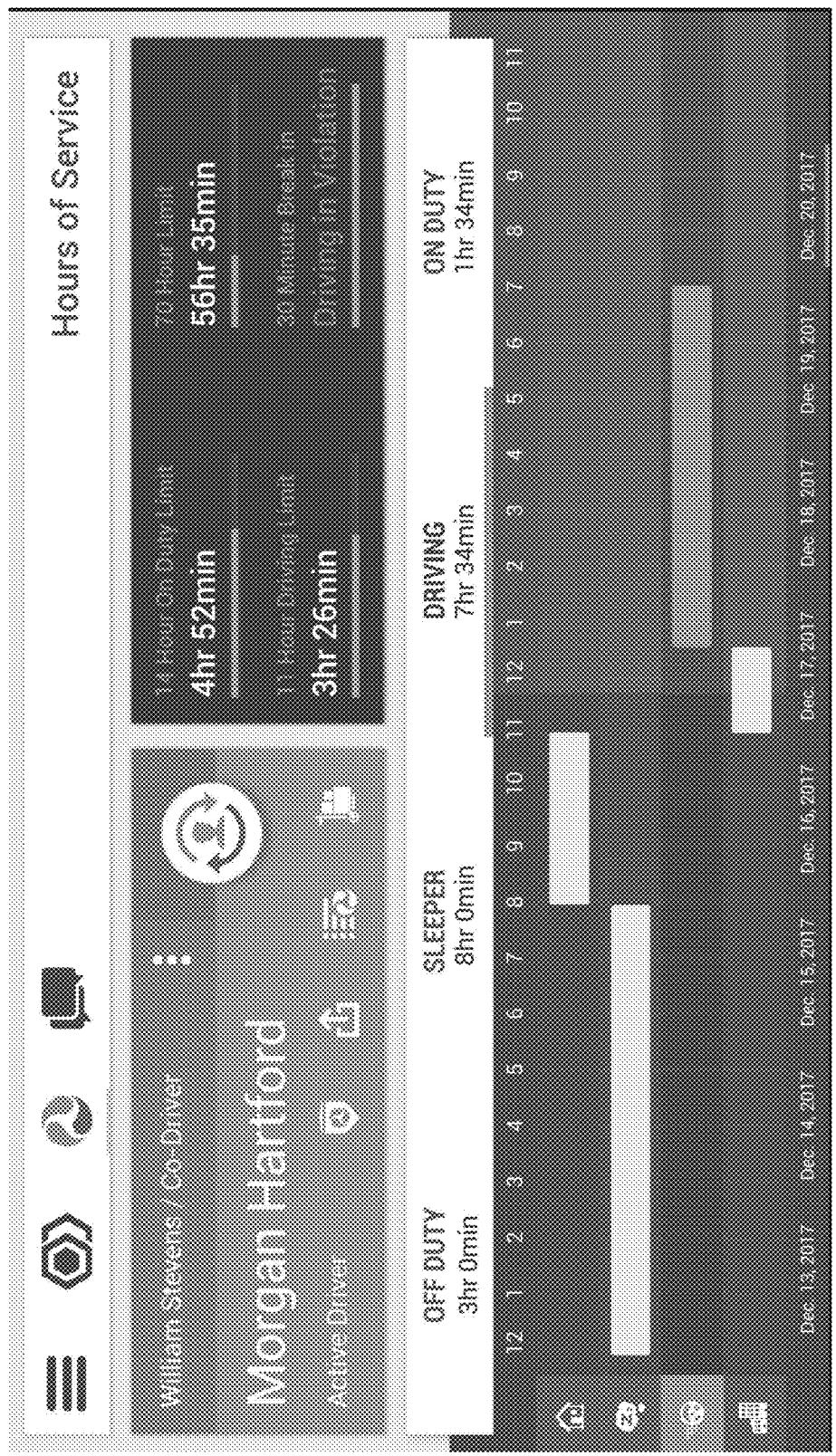
FIG. 3 is an illustration of a user interface for an electronic log with compliance support, according to an exemplary embodiment.

One example regulation concerns the period in which a vehicle operator may legally operate the vehicle. An operator's activity may coincide with one of four exemplary configurations defined by the duty status variables: "Off duty", "Sleeper", "Driving", and "On-Duty". The four duty status variables are binary and mutually exclusive. As would be understood by persons of ordinary skill in the art, while these four statuses are depicted in FIG. 3, there may be fewer or additional driver status configurations displayed. FIG. 3 shows an image of an Electronic Duty Log (ELD) User Interface (UI), which may be represented on a display of a vehicle based computer 110, and also on a Dispatcher computer display 170. The name of the vehicle operator ("current driver") is shown as well as a secondary operator ("co-driver"). A chart format indicates the operating performance of the driver with respect to each of the duty status variables. For example, exemplary FIG. 3 depicts the current drive time, on duty time, and if the driver is in violation of one or more regulations. The ability of the driver to adhere to various prescribed regulatory limits is measured and tracked. In the example UI shown, the driver is "driving in violation" of a regulation, i.e. he has driven for a period that is longer than is regulated, and is therefore, not driving in compliance, and may be subject to a citation for violation of a regulation.

Figure 4:
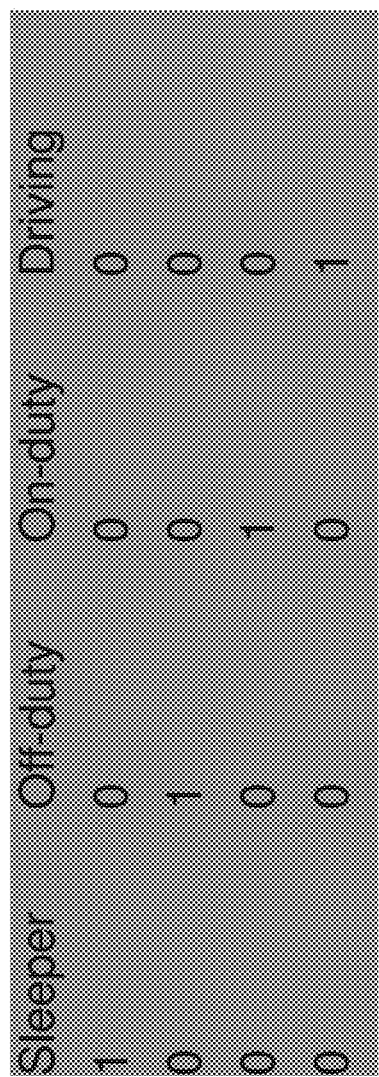
FIG. 4 is a table indicating the possible states of the binary values for the duty status variables, according to an exemplary embodiment.

FIG. 4 illustrates a table indicating the possible states of the binary values for the duty status variables. When a variable is set to a high value (1), the other variables are set low (0). FIG. 3 visually displays the effect in the UI of a duty status variable being set high and low for a predetermined period. As shown in both FIG. 3 and FIG. 4, when the "driving" mode is set high (1), the "on duty", "sleeper", and "off duty" modes are set low (0). In some embodiments, a "Driving" status variable is set high automatically when movement of the vehicle is detected, and an "On-duty" status variable is set high (1), and the "Driving" status variable is set low (0) when movement is interrupted. As shown in FIG. 4, a high (1) state in the any variable causes a low state (0) to be set in all remaining status variables.

Figure 5:
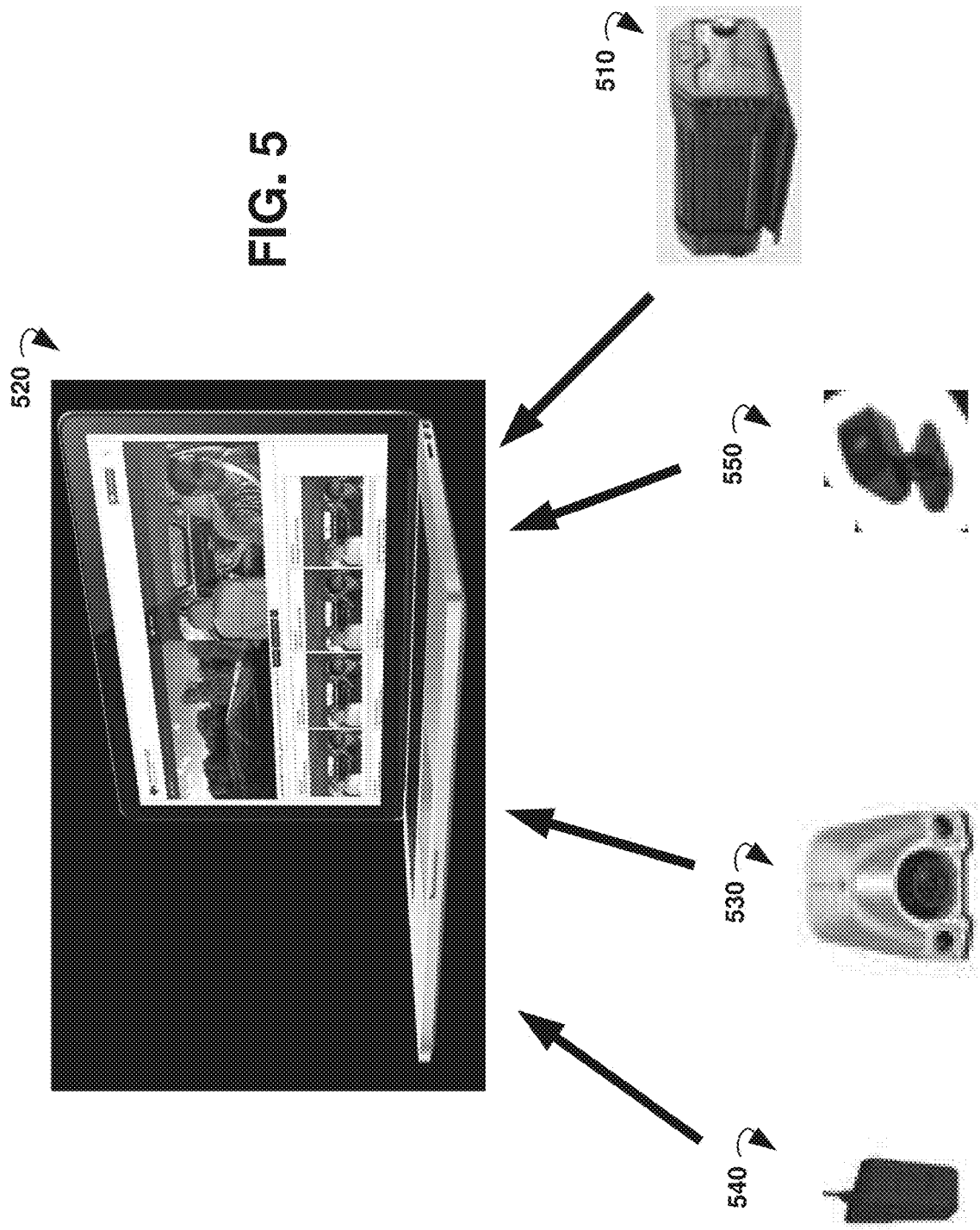
FIG. 5 is an illustration of a camera system, according to an exemplary embodiment.

FIG. 5 illustrates an embodiment of the camera system 220 of FIG. 2, and exemplary images received by a connected computer 520 from the exemplary camera system 220 shown. As would be understood by persons of ordinary skill in the art, while the images depicted in FIG. 5 show one representation of a camera system, additional configurations other than the one pictured may represent the camera system 220 of FIG. 2. A camera system 220 may consist of a single camera or an array of cameras that function to capture multiple images simultaneously, or in sequence. Typically, the camera system houses 5 to 24 cameras. Components of the camera system may be mounted on the interior or exterior of the vehicle, for example on the windshield, and cameras may provide an interior and/or exterior view of a vehicle. Exemplary types of imaging elements within cameras include a focusing lens coupled with a Charge Coupled Device (CCD), or a focusing lens coupled with a Complementary Metal Oxide Semiconductor (CMOS) image sensor. The camera system may include additional optical elements, such as lenses, filters, and optical image stabilizers, which function to enhance images, or correct for optical aberrations. Digital enhancement of images may also be provided through firmware or software within the camera system 220 or by a connected computer 520. An exemplary Fleetcam MDVR is depicted in FIG. 5 as reference number 510. An exemplary side camera 530, windshield camera 540, and driver facing camera 550 are also depicted. Camera system 220 may comprise one or more of the camera components 510, 530, 540, and/or 550, in various embodiments.

In various embodiments, multiple digital images from one or more camera systems may be concatenated as digital image stitching and digital video. Images may be geographically or temporally stitched together to indicate changing road and weather conditions, for example. Stitched images may also offer a panoramic view of vehicle or road conditions. In various embodiments, images are converted into a compressed digital format, and communicated to a computer 520 over a network 140, and may be saved in computer memory as an image file. In various embodiments, image files may be stored in memory local to the camera system 220 in a compressed or uncompressed format, and in high or low resolution formats. It is to be understood that the term "image" as used herein may refer to static images or moving images such as video.

In some embodiments, image files may be routed through a communications network 140 as shown in FIG. 1 and FIG. 2. A computer 520 that receives the image files may be located at the Dispatch center 170, or some other receiving device, such as a remote device 110 positioned in one or more carrier vehicles. In various embodiments, for example, communications bandwidth is reduced by transmitting low resolution images over the network 140, while storing high resolution images (static images and moving video images) in memory local to the camera system 220. Communications bandwidth may also be reduced by using "bread crumb cataloging", whereby image data is sent in periodic bursts, instead of in an uninterrupted stream. An example embodiment may transmit image files for a short duration at five (5) minute intervals. If, for example, an accident occurs between the recording periods, the operator may have a record of the vehicle condition before and after the accident. Since the image transmission is periodic, searching for the approximate time of occurrence is less search intensive.

Exemplary uses for transferred images include driver identification and authentication, sharing of real-time road and weather condition information among carrier vehicles along a common route, monitoring driver physical condition, and providing historical or evidentiary data. In some embodiments, one or more sensor devices may be adapted to work in combination with a camera system 220, where the timing of sensor signals are synchronized with captured images. In various embodiments, the sensor control circuits and sensors are housed together within a portion of the camera system 220. In an exemplary embodiment, a g-force sensor may be provided in a carrier vehicle to detect atypical acceleration and deceleration in longitudinal and lateral directions. Examples of conditions that present atypical g-forces include emergency braking, abrupt vehicle turning at high speed, and vehicular accidents. In response to detection of atypical g-forces, control signals may direct the camera system 220 to capture interior and exterior images to provide visual evidence of the incident to a fleet operator. In some embodiments, a vehicle operator may manually invoke a "panic button" to begin imaging of events. In various embodiments, Global Positioning System (GPS) metadata may be linked to image files and stored or communicated to Dispatch or other vehicles.

Other types of information may also be retrieved from the vehicle on-board computer and/or ECU (Electronic Control Unit) for the vehicle, such as engine speed, rpm, etc. This information, when analyzed in combination with the captured images, can yield additional intelligence regarding the vehicle and/or vehicle operator state. Such information can be analyzed in one or more artificial intelligence models to predict the likelihood of an upcoming violation with at least one regulation, and recommend a corrective action. For example, a camera positioned towards the vehicle operator, in combination with artificial intelligence, can detect that the operator's eyes are starting to close and thus the driver is getting sleepy. This information can be used to suggest to the vehicle operator to take a rest break, and provide a recommendation for the nearest rest stop or lodging facility. Further, a camera positioned towards the vehicle operator can detect when a vehicle operator is distracted, such as using a cell phone or looking away from the road. A warning can then be presented to the operator via the vehicle on-board display.

In other embodiments, a camera facing outwards towards the road, in combination with an artificial intelligence system, can detect lane departures, lane changes without signaling, and following too closely behind another vehicle. In various embodiments, the artificial intelligence system that is used in combination with the images from the camera system is a system of neural networks. ADAS (Advanced Driver Assistance Systems) may also be used in combination with the camera system to predict likelihood of a compliance violation, and provide a recommendation accordingly.

Figure 6:
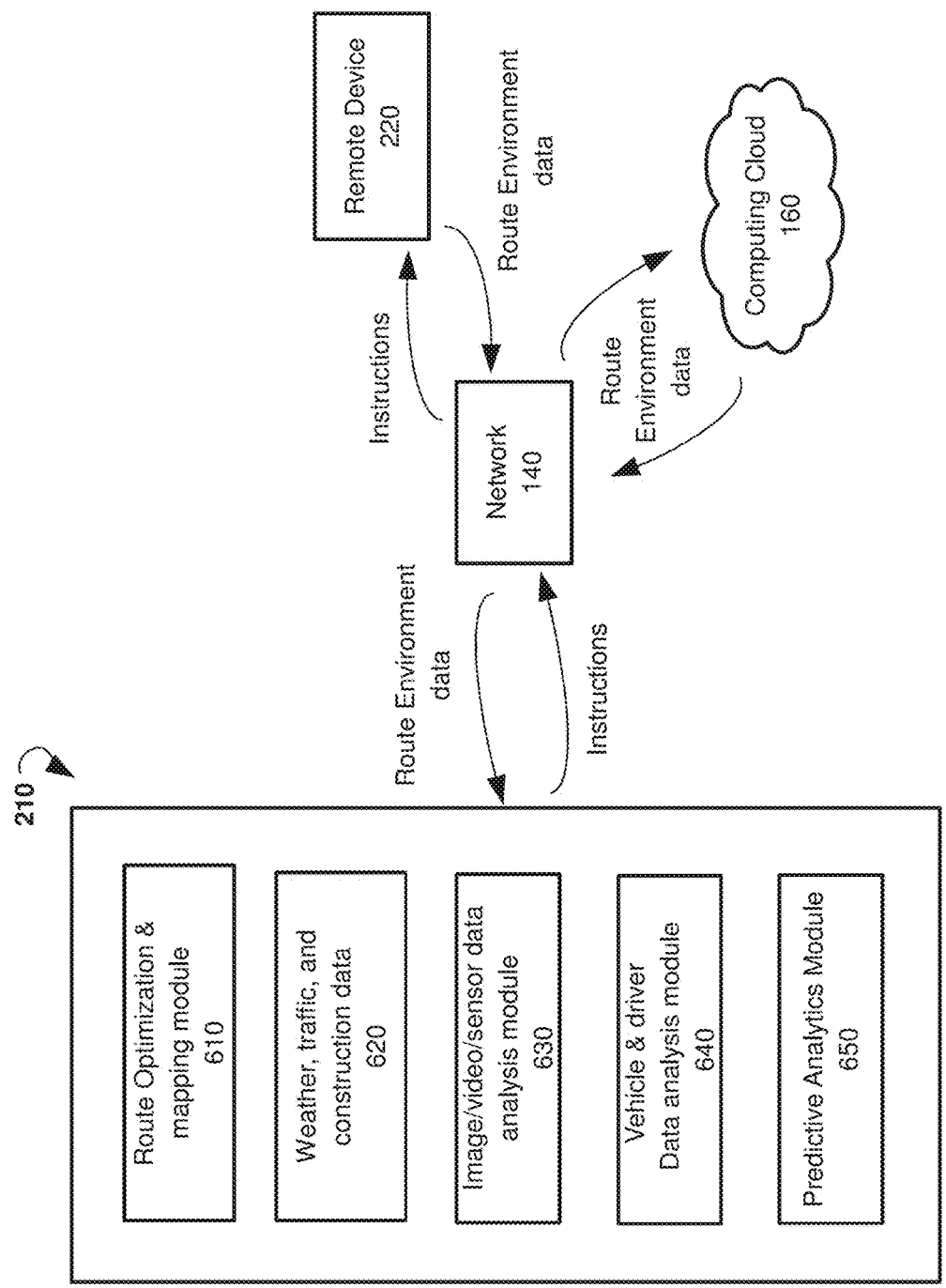
FIG. 6 is an illustration showing a computer and networking interface with modules to perform data aggregation and analyses, according to an exemplary embodiment.

FIG. 6 illustrates an interactive embodiment of a compliance violation avoidance system using real-time route environment data and real-time imaging. A remote imaging and sensor device 220, such as a camera with sensor elements in a carrier vehicle, transmits route environment data through a network 140 to the computer 210 assigned to aggregate vehicle service data, predict impending noncompliance with regulations (e.g. State and Federal), and offer solutions to prevent or mitigate violations of noncompliance. In some embodiments, the computer may include modules for route optimization and mapping 610, modules to analyze recorded and contemporaneous weather, traffic, construction and lodging data 620, modules for analysis of images and sensor data taken en route 630, and modules for analyses of vehicle and driver specific data 640. The incoming route environment data may be stored in a database in memory for later analysis by a predictive analytics module 650. In various embodiments, analysis by the predictive analytics module 650 may detect an impending violation of a compliance regulation, and warn Dispatch 130 or the vehicle operator 120 of the impending violation. In some embodiments, Dispatch 130 or the vehicle operator 120 may determine an appropriate course of action to avoid or mitigate the impending violation. In other embodiments, the predictive analytics module 650 may determine an alternate course of action to avoid or mitigate the violation and offer Dispatch 130 or the carrier vehicle operator 120 the one or more course(s) of action. Route environment data may be received from a remote device 110 and camera system 220 and from computers on a Network 140 or from other servers on a computing cloud 160. The performed predictions may be relayed back to a remote device 110 in a vehicle to alert the vehicle operator to perform actions that may prevent or mitigate the predicted violation.

In exemplary embodiments, a feedback loop may be utilized to combine information from ADAS with the camera system data, interpreted by the artificial intelligence systems. For example, if the camera system data interpreted by the artificial intelligence system detects that a vehicle operator is drowsy, the predictive analytics module 650 can determine where the next rest area is and provide a recommendation to the vehicle operator to make a stop at the nearest rest area. Further, the predictive analytics module 650 can re-calculate the other variables, such as total driving time, on duty time, etc. and alert the vehicle operator as to how the ELD will be affected by the new stop. Other variables besides operator drowsiness can also be detected by the DMS (Driver Monitoring System). In this way, the ADAS and DMS systems may be utilized in concert with artificial intelligence interpreted data from the camera system to provide a feedback to keep a vehicle and a vehicle operator in compliance with regulatory requirements.

Figure 7:
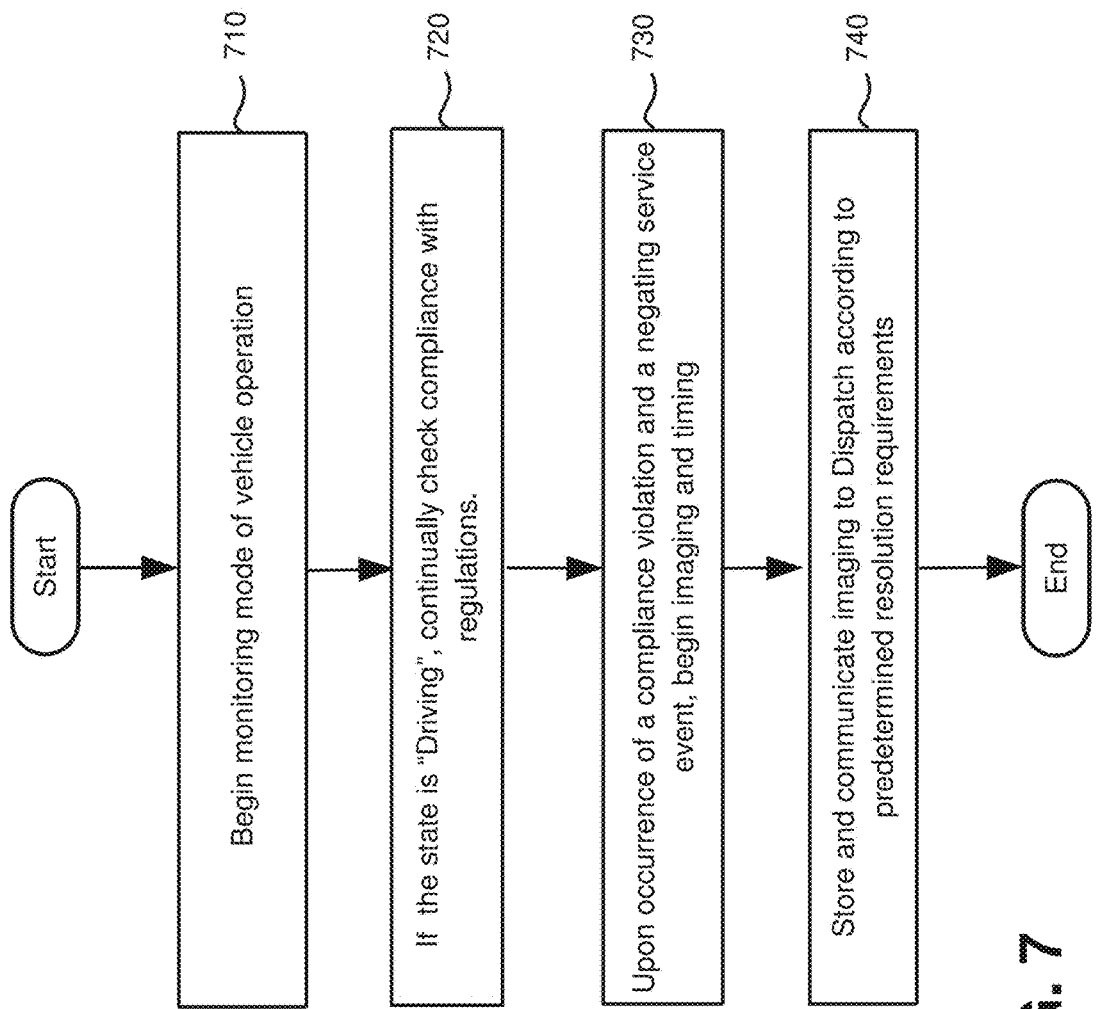
FIG. 7 is a block diagram of a method for evaluating an exception to regulation compliance, according to an embodiment.

FIG. 7 is a block diagram showing an exemplary response to a driving duration compliance violation. Under prescribed conditions, inclement weather of sufficient severity is cause for relaxation of driving period compliance penalties. Initially, the mode of vehicle operation is monitored 710, to determine the state of a duty status variable. If the state is "Driving", for example, the period in that state is monitored to determine compliance with a rule 720. Upon determining occurrence of a regulation noncompliance, the existence of a potential exception, such as inclement weather, may be imaged and timed of the event to provide sufficient evidence to government regulators to exonerate a violation citation 730. The camera system may store the images in local memory in the service vehicle and/or transmit the images to the fleet Dispatcher 130 according to predetermined image resolution standards set by the fleet operator 740, for example.

Figure 8:
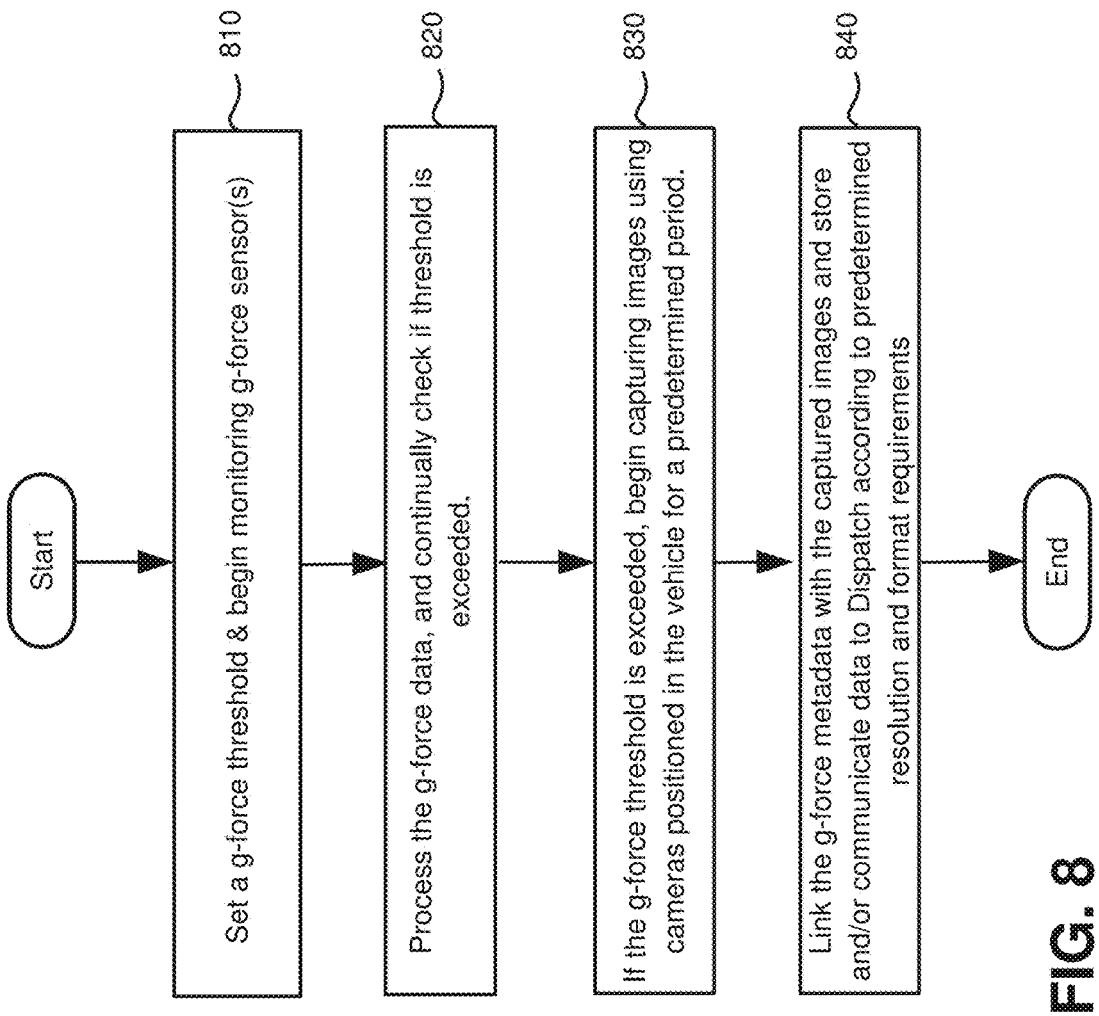
FIG. 8 is a block diagram showing a response to capturing and processing metadata from g-force sensors, according to an embodiment.

FIG. 8 is a block diagram showing an exemplary response to capturing and processing metadata from g-force sensors. In response to an accident, for example, a fleet operator may wish to capture images of activity before, during, and after the accident for insurance or litigation purposes. In some types of accidents, g-force sensors may detect atypical vehicle movement just prior to the vehicular accident and activate the camera to capture images of the event. The following describes an exemplary method of capturing g-force metadata and initiating event imaging. In various embodiments, threshold g-force values are monitored during transit 810. The threshold g-force values identify a g-force that would be typical for safe vehicle operation. A reading from a sensor that exceeds a threshold value indicates atypical vehicle operation that may occur during emergency maneuvers, and vehicle accidents. During vehicle operation sensor metadata is continuously measured and provided to the analysis system, where comparison with the threshold values are performed 820. If a g-force threshold is exceeded, a control signal is sent to the camera system 220 to begin capturing exterior and/or interior views for a predetermined period and/or until captured g-force readings have returned to typical values 830. The g-force metadata is linked to the captured images and stored in memory and/or communicated to the fleet operator (e.g. Dispatch) according to predetermined image resolution and format standards 840.

Figure 9:
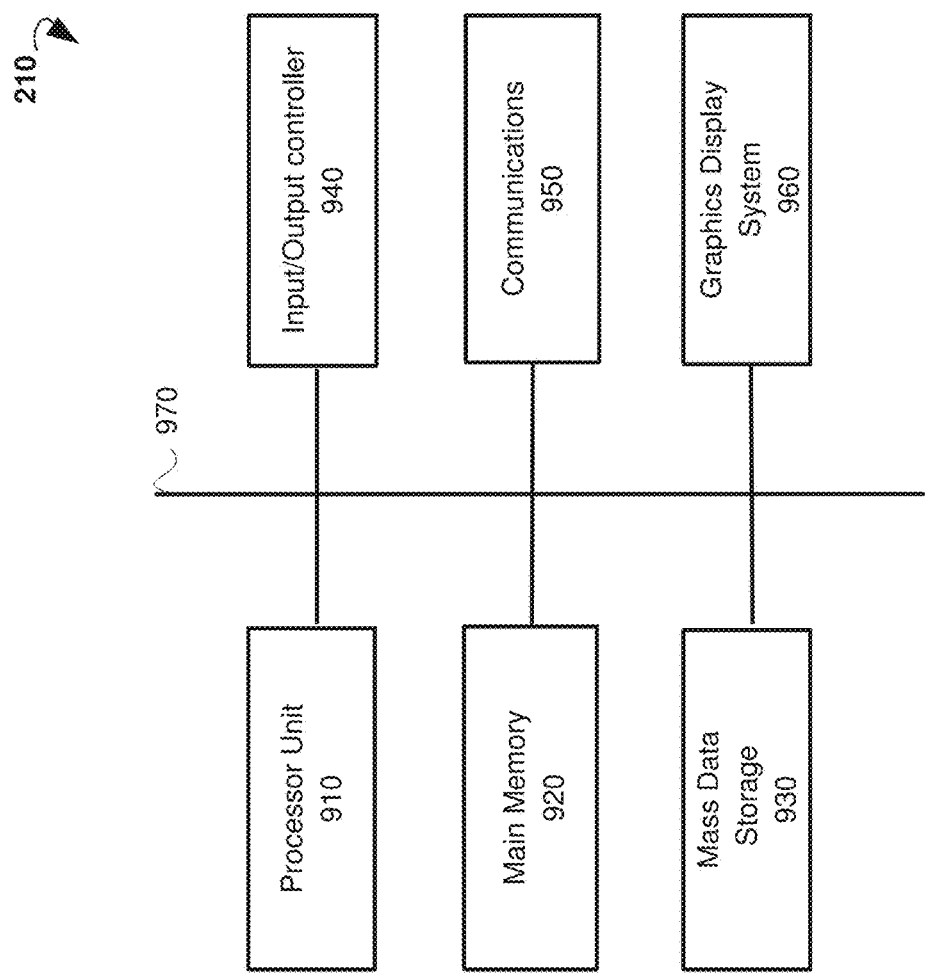
FIG. 9 is a block diagram illustrating the components of a computer for performing image data aggregation and analytics, according to an exemplary embodiment.

FIG. 9 illustrates an exemplary computer system 900 that may be used to implement various elements of the present technology, such as computer 110 or computer 210. The computer system 900 of FIG. 9 may be implemented in the context of computing systems, networks, servers, or combinations thereof. One or more processors 910 may process firmware, and software that implement the data analytics functionality. A memory (e.g., non-transitory computer readable storage medium) 920 may store, at least in part, instructions and data for execution by the processor(s) 910. The computer 900 may analyze carrier-specific, operator-specific, and route-specific data. In various embodiments, carrier-specific information may include company selected route preferences. For example, vehicles carrying hazardous materials, such as oil tankers, must travel on certain roads only. In other embodiments, armored vehicles, school buses, and other types of vehicle carrying specific types of cargo, may need to follow specific routes. Operator-specific data may include total driving time thus far, total on duty time, etc. The route-specific data may include weather, traffic, construction, and vehicle global positioning system (gps) information, and supporting images. Other route-specific information includes rest area location and facilities offered, restaurant location, weigh station location, and hotel accommodation and pricing. For example, the computer 900 may be configured to receive traffic images from the in-vehicle camera system 220 and a computer may store and transmit the images, to be used to help identify locations on a particular route. Images and data may be stored in mass data storage 930 or sent through one or more data buses 970 and a communications module 950, to other computers and operators, such as to Dispatch 130. In various embodiments, one or more databases for storing the data may be present in mass data storage 930. Image and text data may be presented on a computer display via the Graphics Display System 960. Processor units 910 and main memory 920 may be connected using a local microprocessor bus, and the mass data storage device(s) 930, and graphics display system 960 may be connected via one or more input/output (I/O) buses.

Mass data storage device(s) 930, which can be implemented with a magnetic disk drive, solid state drive, or an optical disk drive, is a non-volatile storage device for storing data and instructions for use by processor units 910. A mass data storage device(s) 930 stores the system software for implementing embodiments of the present disclosure, and all or part of the software may be loaded into main memory 920 during program execution.

A remote device 110 located within a vehicle, interfaces with vehicle operators 120 using a User Interface (UI) and User input devices. User input devices may include one or more touchscreen, microphone, an alphanumeric keypad, such as a keyboard, a pointing device, such as a mouse, a trackball, a trackpad, a stylus, or cursor direction keys, for entering and manipulating alphanumeric and other information. Data is presented on a remote device 110, to vehicle operators 120, using output devices such as a speaker, printer, network interface, and graphics display system.

A graphics display system includes a liquid crystal (LCD) display, light emitting diode (LED) display, or other suitable display device. The graphics display system is configurable to receive textual and graphical information and processes the information for output to the display device.

In various embodiments, the interface between hardware, firmware, and software may be directed by one or a plurality of operating systems, including UNIX, LINUX, WINDOWS, MAC OS, ANDROID, IOS, CHROME, TIZEN, and other suitable operating systems.

Portions of the processing for various embodiments may be implemented in software code and data may be cloud-based on one or a plurality of servers. In some embodiments, the computer 900 is implemented as a virtual machine operating within a computing cloud 160. In other embodiments, the computer 900 may be assisted by cloud-based computers, where a plurality of software functions are executed by distributed computers. In various embodiments, one or more databases for storing the data may be present in computing cloud 160.

In general, a cloud-based computing environment is a resource that typically combines the computational power of a large grouping of processors (such as within web servers) and/or that combines the storage capacity of a large grouping of computer memories or storage devices. Systems that provide cloud-based resources may be used exclusively by their owners or the systems may be accessible to other users who deploy applications within the computing infrastructure to obtain the benefit of large computational or storage resources.

The cloud may be formed, for example, by a network of web servers that comprise a plurality of computing devices, similar in configuration to the computer 900 with each server, or at least a plurality thereof, providing processor and/or storage resources. These servers may manage workloads provided by multiple users (e.g., cloud resource customers or other users). Typically, each user places workload demands upon cloud resources that vary in real-time. The nature and extent of these variations may depend, for example, on the type of business served by the resources.

The present technology is described above with reference to example embodiments. The illustrative discussions above are not intended to be exhaustive or to limit embodiments of the disclosed subject matter to the forms disclosed. Modifications and variations are possible in view of the above teachings, to enable others skilled in the art to utilize those embodiments as may be suitable to a particular use.

What is claimed is:

1. A method for integrating a vehicular camera system, the method comprising:
   determining a threshold value for metadata of at least one sensor device;
   capturing a plurality of metadata for a predetermined period by the at least one sensor device positioned in a first carrier vehicle;
   processing the captured plurality of metadata to determine whether the threshold value is exceeded;
   monitoring an occurrence of a compliance rule violation based on a group of compliance rules, the captured plurality of metadata, and an operator driving period;
   capturing a first plurality of images by at least one camera positioned in the first carrier vehicle for a predetermined period, in response to exceeding the threshold value for metadata of the at least one sensor device indicative of a compliance rule violation,
  wherein the first plurality of images comprises images captured by at least one camera on the first carrier vehicle positioned with a view external to the vehicle, and at least one camera on the first carrier vehicle positioned with a view internal to the vehicle,
    wherein the plurality of images with a view external to the vehicle includes representations of events including any road obstructions, traffic conditions, weather conditions, and any markers, and
    the plurality of images with a view internal to the vehicle includes representations of events including vehicle operator identification, and vehicle operator physical condition;
linking the plurality of metadata with each image from the first plurality of images by matching a collection time of the metadata with a collection time for each image from the first plurality of images;
aggregating the first plurality of images as evidence to negate the indicated compliance rule violation; and
communicating to at least one electronic device, a first image selected from the first plurality of images, and the metadata linked to the first image.

2. The method of claim 1, further comprising:
capturing a second plurality of images for a predetermined period by at least one camera;
communicating a second image from the second plurality of images to at least one electronic device;
matching a collection time of the second image to the collection time of the first image; and
concatenating the second image with the first image based on collection time.

3. The method of claim 2, wherein the second plurality of images is captured from a camera located in a second carrier vehicle.

4. The method of claim 1, further comprising:
selecting and performing a storage and image communications protocol conforming to one of:
storing the plurality of images in memory in a high resolution format and communicating at least one image in the high resolution format;
storing the plurality of images in memory in a high resolution format and communicating at least one image in a low resolution format;
storing the plurality of images in memory in a low resolution format and communicating at least one image in a high resolution format; or
storing the plurality of images in memory in a low resolution format and communicating at least one image in the low resolution format, wherein storing images in a low resolution format reduces memory usage, and communicating images in a low resolution format reduces communications bandwidth.

5. The method of claim 1, wherein the metadata comprises g-force data, and GPS data, wherein the g-force data indicates changes in vehicular movement used to indicate atypical acceleration, deceleration, lane change, and vehicle turning, and GPS data indicates geographic location.

6. A system for integrating a vehicular camera system, the system comprising:
a processor; and
a memory communicatively coupled with the processor, the memory storing instructions, which, when executed by the processor, perform a method comprising:
determining a threshold value for metadata of at least one sensor device;
capturing a plurality of metadata for a predetermined period by the at least one sensor device positioned in a first carrier vehicle;
processing the captured plurality of metadata to determine whether the threshold value is exceeded;
monitoring an occurrence of a compliance rule violation based on a group of compliance rules, the captured plurality of metadata, and an operator driving period;
capturing a first plurality of images by at least one camera positioned in the first carrier vehicle for a predetermined period, in response to exceeding the threshold value for metadata of the at least one sensor device indicative of a compliance rule violation,
  wherein the first plurality of images comprises images captured by at least one camera on the first carrier vehicle positioned with a view external to the vehicle, and at least one camera on the first carrier vehicle positioned with a view internal to the vehicle,
    wherein the plurality of images with a view external to the vehicle includes representations of events including any road obstructions, traffic conditions, weather conditions, and any markers, and
    the plurality of images with a view internal to the vehicle includes representations of events including vehicle operator identification, and vehicle operator physical condition;
linking the plurality of metadata with each image from the first plurality of images by matching a collection time of the metadata with a collection time for each image from the first plurality of images;
aggregating the first plurality of images as evidence to negate the indicated compliance rule violation; and
communicating to at least one electronic device, a first image selected from the first plurality of images, and the metadata linked to the first image.

7. The system of claim 6, further comprising:
capturing a second plurality of images for a predetermined period by at least one camera;
communicating a second image from the second plurality of images to at least one electronic device;
matching a collection time of the second image to the collection time of the first image; and
concatenating the second image with the first image based on collection time.

8. The system of claim 7, wherein the second plurality of images is captured from a camera located in a second carrier vehicle.

9. The system of claim 6, further comprising:
selecting and performing a storage and image communications protocol conforming to one of:
storing the plurality of images in memory in a high resolution format and communicating at least one image in the high resolution format;
storing the plurality of images in memory in a high resolution format and communicating at least one image in a low resolution format;
storing the plurality of images in memory in a low resolution format and communicating at least one image in a high resolution format; or storing the plurality of images in memory in a low resolution format and communicating at least one image in the low resolution format, wherein storing images in a low resolution format reduces memory usage, and communicating images in a low resolution format reduces communications bandwidth.

10. The system of claim 6, wherein the metadata comprises g-force data, engine speed, and GPS data, wherein the g-force data and engine speed indicates changes in vehicular movement used to indicate atypical acceleration, deceleration, lane change, and vehicle turning, and GPS data indicates geographic location.

11. A non-transitory computer-readable storage medium having embodied thereon instructions, which, when executed by at least one processor, perform steps of a method, the method comprising:

determining a threshold value for metadata of at least one sensor device;

capturing a plurality of metadata for a predetermined period by the at least one sensor device positioned in a first carrier vehicle;

processing the captured plurality of metadata to determine whether the threshold value is exceeded;

monitoring an occurrence of a compliance rule violation based on a group of compliance rules, the captured plurality of metadata, and an operator driving period;

capturing a first plurality of images by at least one camera positioned in the first carrier vehicle for a predetermined period, in response to exceeding the threshold value for metadata of the at least one sensor device indicative of a compliance rule violation, wherein the first plurality of images comprises images captured by at least one camera on the first carrier vehicle positioned with a view external to the vehicle, and at least one camera on the first carrier vehicle positioned with a view internal to the vehicle, wherein the plurality of images with a view external to the vehicle includes representations of events including any road obstructions, traffic conditions, weather conditions, and any markers, and the plurality of images with a view internal to the vehicle includes representations of events including vehicle operator identification, and vehicle operator physical condition;

linking the plurality of metadata with each image from the first plurality of images by matching a collection time of the metadata with a collection time for each image from the first plurality of images;

aggregating the first plurality of images as evidence to negate the indicated compliance rule violation; and communicating to at least one electronic device, a first image selected from the first plurality of images, and the metadata linked to the first image.

12. The non-transitory computer-readable storage medium of claim 11, further comprising:

capturing a second plurality of images for a predetermined period by at least one camera;

communicating a second image from the second plurality of images to at least one electronic device;

matching a collection time of the second image to the collection time of the first image; and concatenating the second image with the first image based on collection time.

13. The non-transitory computer-readable storage medium of claim 12, wherein the second plurality of images is captured from a camera located in a second carrier vehicle.

14. The non-transitory computer-readable storage medium of claim 11, further comprising:

selecting and performing a storage and image communications protocol conforming to one of:

storing the plurality of images in memory in a high resolution format and communicating at least one image in the high resolution format;

storing the plurality of images in memory in a high resolution format and communicating at least one image in a low resolution format;

storing the plurality of images in memory in a low resolution format and communicating at least one image in a high resolution format; or storing the plurality of images in memory in a low resolution format and communicating at least one image in the low resolution format, wherein storing images in a low resolution format reduces memory usage, and communicating images in a low resolution format reduces communications bandwidth.

15. The non-transitory computer-readable storage medium of claim 11, wherein the metadata comprises g-force data, and GPS data, wherein the g-force data indicates changes in vehicular movement used to indicate atypical acceleration, deceleration, lane change, and vehicle turning, and GPS data indicates geographic location.

* * * * *